(12) United States Patent
Wanner

(10) Patent No.: US 9,779,037 B2
(45) Date of Patent: Oct. 3, 2017

(54) ESTABLISHING CONNECTIVITY OF MODULAR NODES IN A PRE-BOOT ENVIRONMENT

(75) Inventor: Christopher C Wanner, Tomball, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 321 days.

(21) Appl. No.: 14/365,181

(22) PCT Filed: Jan. 30, 2012

(86) PCT No.: PCT/US2012/023173
§ 371 (c)(1),
(2), (4) Date: Jun. 13, 2014

(87) PCT Pub. No.: WO2013/115774
PCT Pub. Date: Aug. 8, 2013

(65) Prior Publication Data
US 2015/0006700 A1 Jan. 1, 2015

(51) Int. Cl.
*G06F 13/14* (2006.01)
*G06F 13/38* (2006.01)
(Continued)

(52) U.S. Cl.
CPC ............ *G06F 13/14* (2013.01); *G06F 9/4411* (2013.01); *G06F 9/5061* (2013.01); *G06F 13/38* (2013.01); *H04L 41/12* (2013.01)

(58) Field of Classification Search
CPC .... G06F 1/3203; G06F 1/3206; G06F 9/4401; G06F 9/4411; G06F 9/4416; G06F 1/26;
(Continued)

(56) References Cited

U.S. PATENT DOCUMENTS 6,549,027 B1 * 4/2003 Mott ................... H05K 7/1445
361/679.02
6,728,216 B1 4/2004 Sterner
(Continued)

FOREIGN PATENT DOCUMENTS

WO WO-02054269 7/2002

OTHER PUBLICATIONS

Boam et al., "Modular Communications Platform", Intel Technology Journal, vol. 7, No. 4, 2003, pp. 7-16.*
(Continued)

*Primary Examiner* — Vivek Srivastava
*Assistant Examiner* — William C McBeth
(74) *Attorney, Agent, or Firm* — Wagner Blecher, LLP

(57) ABSTRACT

Various embodiments described herein provide for establishing connectivity of nodes by employing base management controllers associated with the nodes. For some embodiments, a first data is received at a resource manager from a first base management controller (BMC) associated with a first node, wherein the resource manager is associated with a server computer system. A second data is received at the resource manager from a second BMC associated with a second node. A classification of the first node and the second node are determined and a compatibility of the first node with the second node based on the first data and the second. A topology is generated, at the resource manager, of the first node and the second node.

18 Claims, 3 Drawing Sheets

(51) Int. Cl.
*G06F 9/44* (2006.01)
*G06F 9/50* (2006.01)
*H04L 12/24* (2006.01)

(58) Field of Classification Search
CPC ........ G06F 9/5061; G06F 13/14; G06F 13/38;
H04L 41/08; H04L 41/0803; H04L
41/0806; H04L 41/0866; H04L 41/0873;
H04L 41/12
USPC ........ 709/220, 222, 223, 224, 225; 713/1, 2,
713/300, 310
See application file for complete search history.

(56) References Cited

U.S. PATENT DOCUMENTS

| | | | |
|---|---|---|---|
| 6,968,414 B2* | 11/2005 | Abbondanzio | G06F 13/409 710/104 |
| 7,325,149 B2* | 1/2008 | Liu | G06F 1/3209 713/310 |
| 7,372,806 B2 | 5/2008 | Suemura | |
| 8,037,223 B2* | 10/2011 | Leigh | G06F 13/409 710/313 |
| 2002/0080783 A1 | 6/2002 | Fujimori | |
| 2003/0033399 A1* | 2/2003 | Garnett | G06F 1/183 709/223 |
| 2003/0084367 A1 | 5/2003 | Suemura | |
| 2004/0103327 A1* | 5/2004 | Dake | G06F 1/26 713/300 |
| 2004/0119735 A1* | 6/2004 | Subbarao | H04L 41/0853 715/734 |
| 2004/0230866 A1* | 11/2004 | Yates | G06F 11/273 714/25 |
| 2005/0283624 A1* | 12/2005 | Kumar | G06F 1/3203 713/300 |
| 2006/0123165 A1* | 6/2006 | Narad | G06F 13/4081 710/104 |
| 2007/0294520 A1* | 12/2007 | Leigh | G06F 9/4411 713/1 |
| 2008/0028058 A1 | 1/2008 | Shaw | |
| 2008/0153317 A1* | 6/2008 | Hsu | H04L 49/40 439/61 |
| 2008/0276082 A1* | 11/2008 | Culley | G06F 1/189 713/2 |
| 2009/0077478 A1* | 3/2009 | Gillingham | H04L 41/0803 715/763 |
| 2009/0207862 A1* | 8/2009 | Underwood | H04L 69/24 370/498 |
| 2011/0135312 A1* | 6/2011 | El-Ahmadi | H04L 1/0057 398/135 |
| 2014/0244886 A1* | 8/2014 | Meert | G06F 13/409 710/306 |
| 2014/0337496 A1* | 11/2014 | Ramachandran | H04L 41/24 709/223 |
| 2014/0344419 A1* | 11/2014 | Yoshimura | H04L 41/08 709/220 |
| 2015/0071646 A1* | 3/2015 | Jau | H04B 10/803 398/128 |

OTHER PUBLICATIONS

"HP BladeSystem c7000 Enclosure", Hewlett-Packard Development Company, L.P., Mar. 2008.*
Overgaard, "ATCA E-Keying Aids Fabric Management", RTC Magazine, Feb. 2004.*
Overgaard, "Off-the-shelf management solutions for AdvancedTCA boards", CompactPCI Systems, May-Jun. 2003.*
Predki et al., "Hot-plug Based Activation and Deactivation of ATCA FRU Devices", 16th International Conference Mixed Design of Integrated Circuits and Systems, Jun. 25-27, 2009, pp. 119-122.*
Brey et al., "BladeCenter chassis management", IBM Journal of Research and Development, vol. 49, No. 6, Nov. 2005, pp. 941-961.*
Extended European Search Report dated Sep. 8, 2015, EP application 12867204.5, 12 pages.
Kevin Leigh, "General-purpose blade infrastructure for configurable system architectures," Mar. 22, 2007, 30 pps.
Krishna Kant, "Data Center Evolution A Tutorial on state of the art, issues, and challenges, Computer Networks," Elsevier Science Publishers, vol. 53, No. 17, Dec. 3, 2009, 27 p.
International Searching Authority, The International Search Report and the Written Opinion, Oct. 16, 2012, 10 Pages.

* cited by examiner

ESTABLISHING CONNECTIVITY OF MODULAR NODES IN A PRE-BOOT ENVIRONMENT

FIELD

Embodiments of the present invention relate generally to establishing connectivity of modular nodes in a pre-boot environment.

BACKGROUND

Server computer systems have a multiple components and parts that interconnect with one another. A server computer system may be designed such that connections between components are modules are predetermined. Predetermined connections allow software and users to know the topology of server computer system and its components. As computer systems become more complex and modular with more components and modules, it becomes increasingly difficult to design computer systems with a predetermined topology.

Figure 1:
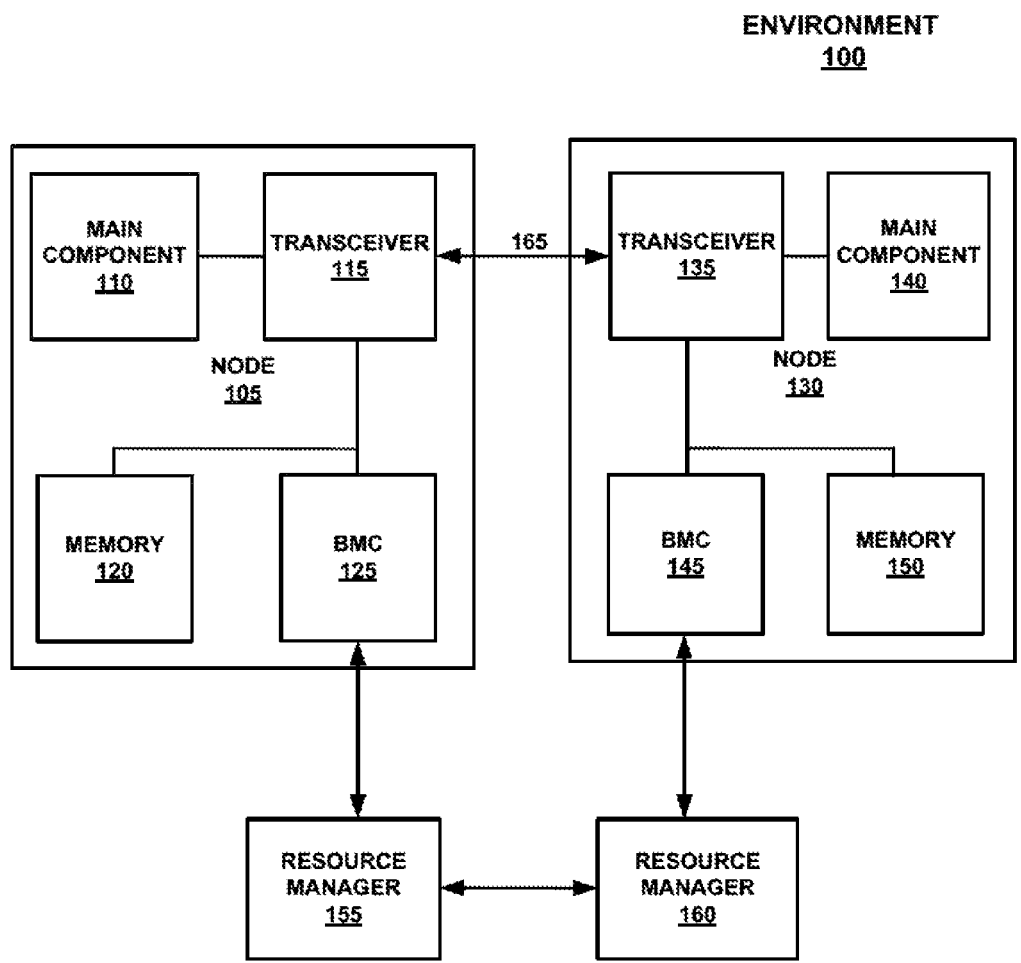
FIG. 1 illustrates a block diagram of an example environment for establishing connectivity of nodes in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving", "determining", "generating", "sending", "providing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Overview of Discussion

Data centers are becoming increasingly complex with an increasing number of computer systems with multiple modules and components that are interconnected using physical connections. Such modules and components may be described as nodes or endpoints. To efficiently and effectively describe, configure, and manage these physical connections between endpoints, it is necessary to have knowledge of the physical connections. Such knowledge may be described as a topology. It is also necessary to have such knowledge before components are booted up and running to ensure the compatibility of components with one another or with the overall computer system or a compatibility with a power source. Endpoints or components may be network interface cards, switches, processors, a blade server, a power supply, a storage medium, a fan, etc. As used herein, pre-boot or before a component is booted up may refer to the component in a pre-power environment where the component is connected with a power source but has not been powered on and is not running or is not online.

Some computer systems are designed with a predetermined topology. For example a blade computer system comprises blade fabric connectors and only allows specific components or blades to be connected with the fabric connector. Thus a resource manager associated with the blade computer system has a predetermined knowledge of the topology of components and nodes associated with the blade computer system. A predetermined topology becomes increasingly difficult as physical connections are made with components outside of a rack or chassis of a given computer system. Such outside connections are increasingly used. For example, optical connections allow components and nodes to be located further apart than electrical connections. Thus a computer system may be interconnected with another computer system or other nodes that are located inches away or even hundreds of meters away.

In one embodiment, a blade computer system comprises multiple nodes and a resource manager within a blade enclosure or chassis but may be physically connected to nodes outside of the blade enclosure or chassis. Such outside connections make it difficult or impossible to program the resource manager with a predetermined topology of all the connections between nodes.

The present technology employs base management controllers associated with nodes to establish connectivity of nodes in a pre-boot environment. This technique may also be described as discovering connectivity or topology or may be described as gathering of connectivity information of nodes. The present technology also discovers the classification or type of node that is connected as well as protocols and power needs used by the node. This information gathered or discovered may be employed determine a physical topology of the nodes and employed to manage the nodes efficiently. Such discovering and gathering of information occurs using software and hardware components associated with the nodes and computer systems and may occur automatically. Thus the present technology greatly reduces the effort required by a user to manually determine and enter the physical connections.

The present technology also allows for security measures to be taken before a component is allowed to boot up or is in a pre-power environment. For example, a component associated with a node may be a storage medium that should only be booted up behind a firewall. The present technology allows the storage medium and the connection associated with the storage medium to be discovered before the storage medium is booted up and thus a firewall may be properly established before the storage medium is booted up.

One prior solution is cable tagging where each end of the cable is tagged with a unique identifier so that a user can identify the cable without manually following the cable through conduits, behind equipment, under floors, etc. from one end to the other. Tagging solutions may use color coding of the cables and taping a tag on each end identifying the source port and/or destination. However there is little to no automation involved with this method, it requires a lot of effort to change, it is prone to mistakes, and loses its effectiveness as the number of individual links in a multi-link bundle increases. Additionally, tagging is typically associated with a cable and not associated with the type of fabric that will be transmitted across that cable and thus tagging does not help resolve fabric type related connectivity checking. The present technology offers solutions to problems associated with cable tagging.

Another prior solution is fabric level cable discovery. Fabric level cable discovery requires that the nodes are up and running, there are mechanisms to discover what node is on the other end of a connection such as link layer protocol. However, fabric level cable discovery cannot be employed prior to booting up the components of the nodes including operating systems or firmware. The present technology allows for the discovery of connections in a pre-boot environment before an operating system or firmware of a component is booted up and running. The present technology is also well suited to operate in an environment where the connections are optical connections.

The following discussion will demonstrate various hardware, software, and firmware components that are used with and for establishing connectivity of nodes. Furthermore, the devices, computer systems and their methods may include some, all, or none of the hardware, software, and firmware components discussed below.

Embodiments of Establishing Connectivity of Nodes

With reference now to FIG. 1, a block diagram of an example environment for establishing connectivity of nodes is shown in accordance with embodiments of the present technology. Environment 100 comprises components that may or may not be used with different embodiments of the present technology and should not be construed to limit the present technology.

In one embodiment, node 105 is a computer system or other device comprising main component 110, transceiver 115, memory 120, and base management controller (BMC) 125. Node 105 may be a standalone node or may be incorporated in a larger computer system such as a rack or row computer server or a blade computer system. Node 105 may be described as an endpoint and may have ports, fabric connectors, or other hardware connectors. Such hardware connectors may be associated with transceiver 115. Node 105 may have its own resources such a power supply or may share resources with other nodes. Main component 110 may be a network interface card (NIC), a switch, a central processing unit (CPU), a blade for a blade server, a host bus adapter (HBA), host controller adapter (HCA), a power supply, a storage medium, a fan, etc. Main component 110 may have an operating system or firmware that requires a boot up process for main component 110 to be up and running. In one sense, main component 110 generates data that is sent using transceiver 115. Node 105 may also comprise more than one component that shares the resources of node 105 such as BMC 125 and transceiver 115. Node 105 is well suited for connected with other nodes via optical connections.

In one embodiment, node 105 comprises memory 120 which may store a first data related to main component 110. Such first data may have data or information regarding main component 110's configuration, protocols, power requirements, classification (e.g. an NIC, a switch, a storage medium, etc.) or other data about main component 110. In one embodiment, memory 120 is electrically erasable programmable read-only memory (EEPROM) and is used to store data when power is removed from memory 120. In one embodiment, memory 120 is FRU EEPROM. Node 105 may comprise more than one memory module.

In one embodiment, BMC 125 is a base management controller associated with node 105. BMC 125 comprises hardware and software components including a micro-processor. BMC 125 is separate from a processor associated with main component 110 and is used to manage node 105. BMC 125 may be capable of gathering information regarding node 105 such as a temperature, environmental data, as well as data from memory 120 such as the first data with information regarding the configuration of main component 110. In one embodiment. BMC 125 is Hewlett-Packard Development Company's integrated lights out (iLO) management controller. BMC 125 is able to send and receive data to and from transceiver 115 including the described first data. In one embodiment, BMC 125 is able to directly communicate with resource manager 155 without the use of transceiver 115. BMC 125 may also be tasked with running node 105. For example, main component 110 may not boot up or shut down until it receives a command from BMC 125 to do so. BMC 125 may also be able to adjust operating parameters for main component 110. BMC 125 may be capable of managing components in addition to main component 110.

In one embodiment, power is applied to node 105. Initially, only low-power essential devices or components of node 105 are powered on. For example, main component 110 is not powered on nor is it booted up while BMC 125, transceiver 115 and memory 120 are powered on and booted up. In this manner the present technology may operate in a pre-boot environment meaning that main component 110 has not been booted up. In such a pre-boot environment, transceiver 115 may send and receive signals with other transceivers and BMC 125 may communicate with transceiver 115 as well as resource manager 155. In one embodiment, BMC 125 employs electronic keying (E-keying) as an electronic means or mechanism to interrogate main component 110 to determine compatibility of main component 110 with other nodes or computer systems before main component 110 has booted up. Once compatibility is determined by BMC 125 and resource manager 155, then permission or authorization may be given to main component 110 to power on and boot up. It should be appreciated that resource manager 155 is comprised of software and hardware components.

E-keying exists in a pre-boot environment where only a few essential low power components such as BMC 125 is powered on and running. Because this checking and information gathering is done in a pre-boot environment the user avoids possible damage to devices as well as avoiding the time, effort, and complexity of booting the hardware and loading multiple levels of software such as hypervisor, operating, drivers, etc. needed before protocol layer discovery capabilities can be accomplished. In one embodiment, resource manager 155 can provide immediate feedback to the user indicating compatibility of connections which facilitates a significantly quicker resolution of connectivity issues. Thus the present technology provides a means by which the optical interconnect topology can be determined in a pre-boot environment and thus for the user to be able to rapidly deploy and manage optical interconnects. Therefore the present technology may be used to facilitate user acceptance of pervasive and dense optical interconnects.

In one embodiment, transceiver 115 is capable of sending and receiving data. The data may be generated by either main component 110 or BMC 125. Transceiver 115 may send and receive the first data from BMC 125 containing configuration data for main component 110. In one embodiment, transceiver 115 is an optical transceiver capable of sending and receiving message over an optical connection. In one embodiment, transceiver 115 is able to receive electrical signal from main component 110 and BMC 125 and translate the electrical signal to an optical based signal for transmission over an optical fiber connection. Transceiver 115 is also able to receive optical based signals and translate the optical based signal into an electrical signal which is then relayed to main component 110 and/or BMC 125. Transceiver 115 may be described as an Electrical-to-Optical (EO) engine or in another example, an electrical-to-electrical transceiver. In one embodiment, transceiver 115 communicates with transceiver 135 of node 130 over connection 165. Connection 165 may be an optical connection, but may also be an electrical connection or another well-known connection used for connecting nodes and components related to computer systems for sending and receiving signals.

In one embodiment, BMC 125 is connected to transceiver 115 via an interface such as inter integrated circuit ($I^2C$) interface. Transceiver 115 may contain registers accessible from the $I^2C$ interface. These registers contain configuration information that can be read or written to by BMC 125. To establish pre-boot connection discovery BMC 125 would write an ID value to transceiver 115 through the $I^2C$ interface. This ID could be any set of numbers or characters that is unique across the datacenter.

The respective BMCs would push these ID's into the register space of the local transceiver and then the BMC would initiate a command to the transceiver to transmit their ID's across the link as well as be ready to receive ID's from the link as well. There are several mechanisms possible for transmission of the IDs across a link both synchronously and asynchronously. This can be done across all lanes in a multi-lane link with lane IDs as well if desired. Appropriate synchronization codes might be used to ensure proper transmission and reception of the IDs to the far end of the link. Upon reception of an ID the transceiver would store the ID in a register for the local BMC to read. The BMC is notified of the receipt of an ID either through a polling mechanism or through an interrupt from the transceiver. After the BMC reads the remote ID the BMC will provide that information to the resource manager which in concert with other infrastructure managers can then put together a full connectivity table that describes all the optical connections throughout the data center thus establishing a pre-boot connection topology over the interconnects. Policies may be established for how often or when a transceiver transmits and receives IDs. Such an ID may be employed by a BMC or resource manager to identify, determine or classify what type of component a component is. For example, the BMC or resource manager may identify that the main component in a node is a storage medium and more specific details about the storage medium such as model type, operating parameters, capacity, speed, connections types, etc.

Resource manager 155 is depicted as being in communication with BMC 125. In one embodiment, resource manager 155 receives data from BMC 125 such as the first data containing configuration information for main component 110. BMC 125 may also send data to resource manager 155 regarding other nodes that node 105 is connected to. For example, BMC 125 in conjunction with transceiver 115 may receive information that node 105 is physically connected with node 130 via connection 165. Such data may be sent to resource manager 155. Resource manager 155 is then able to determine the compatibility of main component 110 with main component 140. The compatibility may be based on protocols associated with the main components. Resource manager 155 may also be able to determine compatibility of main component 110 with a power source. For example, node 105 may be connected to a shared power source that may or may not meet the requirements of main component 110. Resource manager 155 can determine the power compatibility and the compatibility with other components and then send an authorization or a command for main component 110 to power on. It should be appreciated that node 105 and node 130 may share the same resource manager, or may each have an independent resource manager as is depicted in FIG. 1. In one embodiment, nodes sharing the same resource manager may be part of the same enclosure, rack, blade computer server or other computer system. In one embodiment, nodes not sharing resource managers may not be part of the same enclosure, rack, blade computer server or other computer system. Resource manager 155 is also capable of providing compatibility information and topology information to a user or other resource manager.

Figure 2:
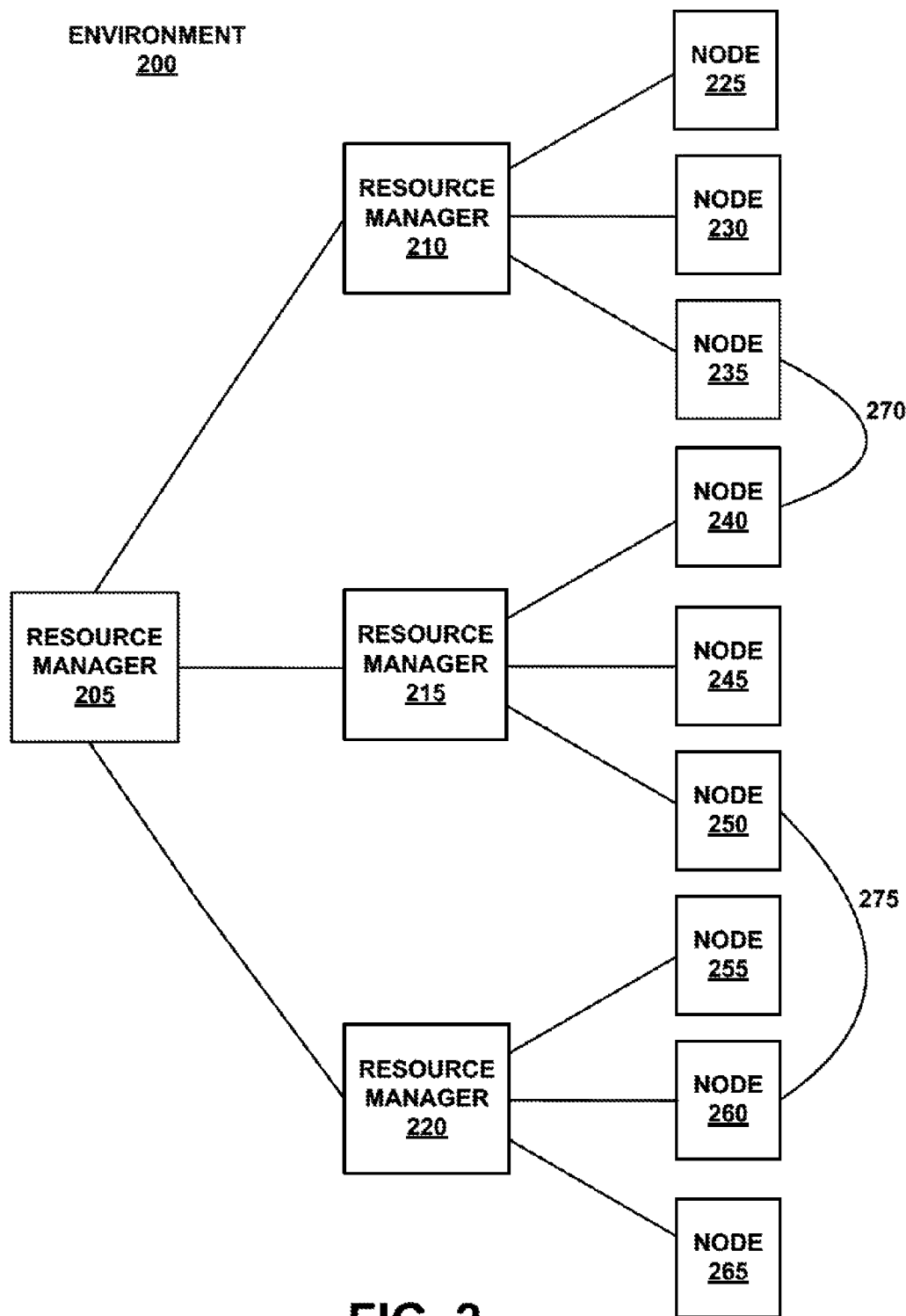
FIG. 2 illustrates a block diagram of a management hierarchy and topology of nodes in accordance with embodiments of the present technology.

FIG. 2 depicts node 105 and node 130 with resource managers 155 and 160. It should be appreciated that any number of nodes and resource managers may be employed by the present technology. FIG. 2 depicts a different number of nodes and resources managers than FIG. 1. Node 205, transceiver 135, main component 140, BMC 1145, and memory 150 have features and capabilities similar to node 105, main component 110, transceiver 115, memory 120, and BMC 125 respectively. It should be appreciated that main component 110 and main component 140 may be the same type of component or may be distinct from one another.

With reference now to FIG. 2, a block diagram of an example environment of a management hierarchy is shown in accordance with embodiments of the present technology. Environment 200 comprises components that may or may not be used with different embodiments of the present technology and should not be construed to limit the present technology.

FIG. 2 depicts resource managers 205, 210, 215 and 220 which have features and abilities similar to resource managers 155 and 160 of FIG. 1. Resource managers 205, 210, 215 and 220 are able to communicate with BMC's as well as with one another. The resource managers work together to determine, discover and gather information related to link topology as well as make determine, discover and gather information related compatibility of nodes and components with other nodes and components include power sources. FIG. 2 depicts nodes 225, 230, 235, 240, 245, 250, 255, 260 and 265 which have features, components, and abilities similar to node 105 of FIG. 1. Environment 200 may depicts an example of a network topology. Network topologies associated with the present technology may be vast, varied and far more complex than what is depicted by environment 200.

In one embodiment, resource manager 210 is combined with nodes 225, 230 and 235 in the same physical enclosure, rack, computer system, or blade server. Thus the nodes are able to share resource manager 210. Nodes 225, 230 and 235 may also share other resources such as a power source or fan. In such an embodiment, the connectivity of resource manager 210 with nodes 225, 230 and 235 may be predetermined by design of the physical architecture of the system. However, nodes 225, 230 and 235 may be connected with nodes outside of the same physical enclosure, rack or blade system. Connection 270 depicts a scenario where node 235 is connected with node 240 where node 235 and node 240 are not part of the same physical architecture and do not share resources. The present technology is capable to operate in a pre-boot or pre-power environment where the main components of node 235 and 240 have not been booted up yet or are in a pre-power environment and can determine the compatibility of node 235 and 240 with one another and with power sources or other resources. Similarly, connection 275 depicts nodes 250 and 260 connected to one another where nodes 250 and 260 do not directly share a resource manager and are not part of the same physical architecture that shares resources.

Resource managers 205, 210, 215 and 220 may be connection with one another to determine topology. For example, connection 270 may require resource managers 210 and 215 to communicate, or in a different scenario resource managers 210 and 215 both communicate with resource manager 205 which makes determination regarding compatibility and classifications. Connections 270 and 275 may be optical connections. Environment 200 may comprises both electrical and optical connections and be fully compatible with the present technology.

With the appropriate BMC and resource managers to facilitate the present technology, the process for establishing pre-boot connectivity can be fully automated making for a superior user experience in managing the expected explosion of the quantities of optical links in the datacenter.

Establishing connectivity topologies in a pre-power and/or pre-boot environment greatly decreases the time and effort needed to establish the information on how elements or components of a data center or fabric connected infrastructure are interconnected. Attempting to do this after each of the components, i.e. compute nodes, storage node, etc., are powered up and connected is akin to powering on and booting up all components and nodes of a data center without knowing ahead of time whether it is even possible to do with a given topology. The present technology overcomes this limitation by operating in a pre-boot environment and is able to make compatibility determinations before nodes or components of nodes are fully powered on and booted up. The present technology is also capable of providing warnings to user if components are not compatible or if security measures, i.e. firewalls, need to be established before booting up. The present technology can also automatically send commands or authorizations to boot up components if compatibility exists and provide topology information to a user.

The present technology also operates to identify or classify what type a node is or a component associated with a node. This information may be used by resource managers to configure and manage the data center as a whole as well as node individually to increase efficiency or provide for other optmizations.

In one example, one end of an optical link is described as being an InfiniBand endpoint and the other end of the link is described as an Ethernet endpoint, this incompatibility can be flagged to the user automatically within a matter of moments after both ends of an optical link have been made. In another example, the wrong mezzanine card may be installed or the cables were incorrectly run between racks. In either case the user will have this knowledge made available almost immediately and certainly prior to the endpoints having to be booted. This saves significant time to resolve possible connectivity issues.

Operation

More generally, operations or methods are described for embodiments in accordance with the present invention, establishing connectivity or topology of nodes. Such methods can be implemented using computer systems and components described in FIGS. 1 and 2.

Figure 3:
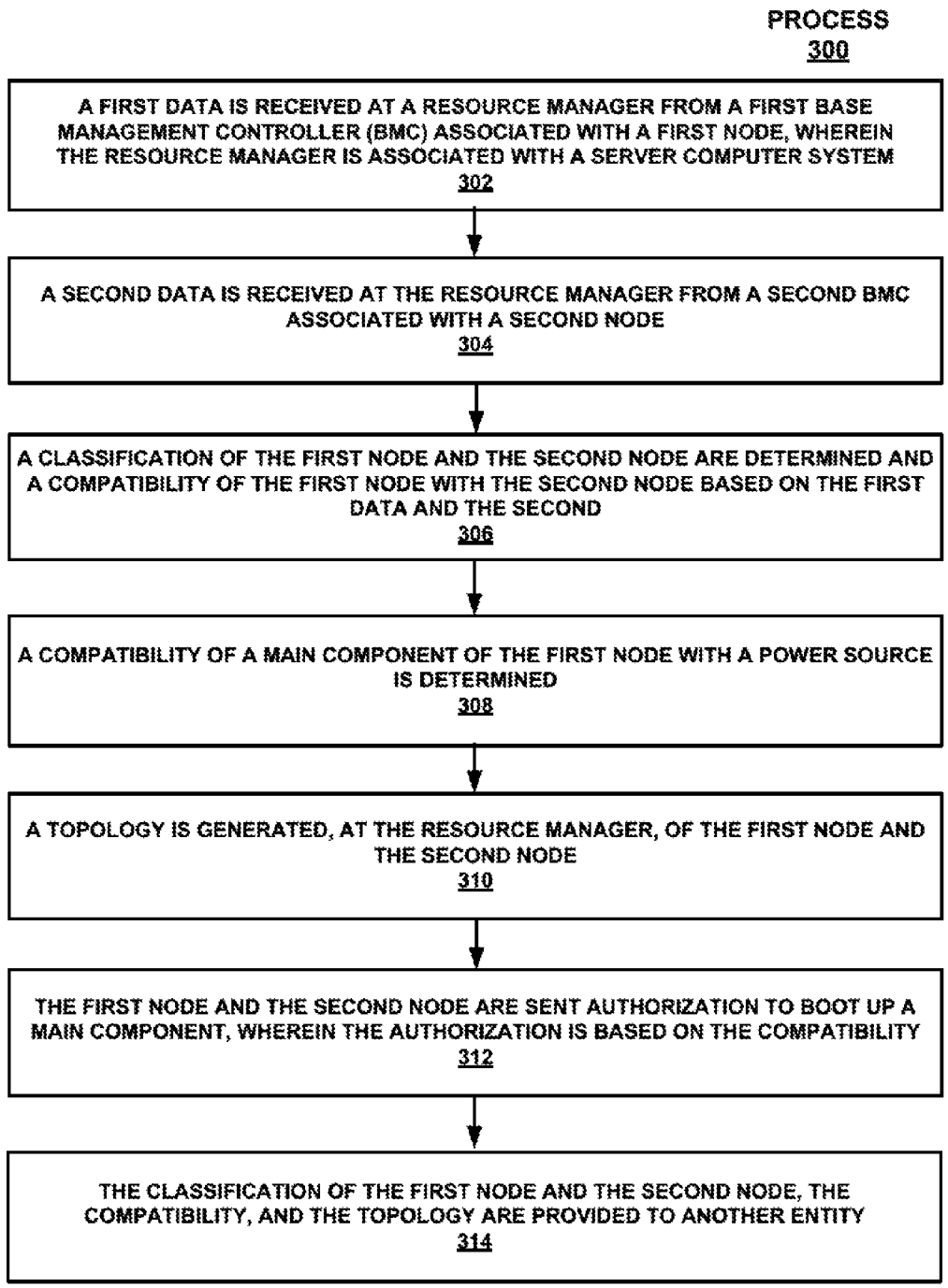
FIG. 3 illustrates a flowchart of an example method for establishing connectivity of nodes in accordance with embodiments of the present technology.

FIG. 3 is a flowchart illustrating process 300 for establishing connectivity of nodes, in accordance with one embodiment of the present invention. In one embodiment, process 300 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one embodiment, process 300 is performed by environment 100 of FIG. 1.

At 302, a first data is received at a resource manager from a first base management controller (BMC) associated with a first node, wherein the resource manager is associated with a server computer system.

At 304, a second data is received at the resource manager from a second BMC associated with a second node. In one embodiment, the second data is received a resource manager separate and distinct from the resource manager described in 302. In one embodiment, the resource manager of 302 and 304 are the same. Data received from the first and second node may be sent over an optical or electrical connection. Nodes may be physically interconnected with one another using optical or electrical connections as well as other well-known connections for transmitting and receiving data signals between nodes, components, or computer systems.

At 306, a classification of the first node and the second node are determined and a compatibility of the first node with the second node based on the first data and the second data. Such a classification may be an identification of main components of the first and second node are. For example, the BMC or resource manager may identify that the main component in a node is a storage medium and more specific details about the storage medium such as model type, operating parameters, capacity, speed, connections types, etc.

At 308, a compatibility of a main component of the first node with a power source is determined. For example, the first node may share a power source with other nodes. The main component of the node may or may not be compatible with the shared power source. The present technology is able to provide a notification to a user regarding the compatibility of a power source with a component thus ensuring that damage is not done to a power source or a component if a component is powered on and booted up when it is not compatible.

At 310, a topology is generated, at the resource manager, of the first node and the second node. Such a topology may visually or otherwise demonstrate how a group of nodes interconnect with each other. The topology may comprise any number of nodes and resource managers. Environment 200 of FIG. 2 is an example of a topology.

At 312, the first node and the second node are sent authorization to boot up a main component, wherein the authorization is based on the compatibility. Such an authorization may occur automatically and may also include a command to power on or off.

At 314, the classification of the first node and the second node, the compatibility, and the topology are provided to another entity. The entity may be a user or another resource manager.

In one embodiment, the steps of process 300 occur in a pre-boot environment where the main components of the nodes have not been powered on or booted up. The main components may have a power source connected or applied, but have not been powered on. BMC's, memory and resource managers may be powered on and booted up to accomplish process 300.

Example Computer System Environment

Portions of the present technology are composed of computer-readable and computer-executable instructions that reside, for example, in computer-usable media of a computer system. Described below is an example computer system or components that may be used for or in conjunction with aspects of the present technology.

It is appreciated that that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for establishing connectivity of nodes, said method comprising:
    transmitting, by a first base management controller (BMC) associated with a first node, a first identifier associated with the first node onto a connection via a first transceiver of the first node;
    transmitting, by a second BMC associated with a second node, a second identifier associated with the second node onto the connection via a second transceiver of the second node;
    receiving, at the first BMC while the first node is in a pre-boot environment, first data including configuration information for the first node and the second identifier from the second BMC over the connection via the first transceiver;
    receiving, at a resource manager, the first data and the second identifier from the first BMC, wherein said resource manager is associated with a server computer system;
    receiving, at the second BMC while the second node is in a pre-boot environment, second data including configuration information for the second node and the first identifier from the first BMC over the connection via the second transceiver;
    receiving, at said resource manager, the second data and the first identifier from the second BMC;
    determining, by said resource manager, a classification of said first node and said second node and a compatibility of said first node with said second node based on said first data and said second data; and
    generating, by said resource manager, a topology of said first node and said second node based on the first identifier and the second identifier,
    wherein transmitting, by the first BMC, the first identifier associated with the first node onto the connection via the first transceiver comprises:
    pushing, by the first BMC, a first identifier associated with the first node onto a register space of the first transceiver;
    initiating, by the first BMC, a command to the first transceiver to transmit the first identifier onto the connection; and
    transmitting, by the first transceiver, the first identifier onto the connection responsive to initiation of the command.

2. The method of claim 1 wherein the transceiver of each of said first node and said second node comprises an optical transceiver connected to an optical connection, and wherein the connection comprises the optical connection.

3. The method of claim 1 wherein said first node and said second node each comprise a main component and said receiving said first data and said receiving said second data occur before said main component of said first node and said second node boot up.

4. The method of claim 1, further comprising:
sending said first node and said second node authorization to boot up a main component, wherein said authorization is based on said compatibility.

5. The method of claim 1, further comprising:
providing said classification of said first node and said second node, said compatibility, and said topology to another entity.

6. The method of claim 1, further comprising:
determining a compatibility of a main component of said first node with a power source.

7. A non-transitory computer-usable storage medium having instructions embodied therein that when executed cause a computer system to perform a method for establishing connectivity of nodes, said method comprising:
transmitting, by a first base management controller (BMC) associated with a first node, a first identifier associated with the first node onto a connection via a first transceiver of the first node;
transmitting, by a second BMC associated with a second node, a second identifier associated with the second node onto the connection via a second transceiver of the second node;
receiving, at the first BMC while the first node is in a pre-boot environment, first data including configuration information for the first node and the second identifier from the second BMC over the connection via the first transceiver;
receiving, at a resource manager, the first data and the second identifier from the first BMC, wherein said resource manager is associated with a server computer system;
receiving, at the second BMC while the second node is in a pre-boot environment, second data including configuration information for the second node and the first identifier from the first BMC over the connection via the second transceiver;
receiving, at said resource manager, the second data and the first identifier from the second BMC;
determining, by said resource manager, a classification of said first node and said second node and a compatibility of said first node with said second node based on said first data and said second data; and
generating, by said resource manager, a topology of said first node and said second node based on the first identifier and the second identifier,
wherein transmitting, by the first BMC, the first identifier associated with the first node onto the connection via the first transceiver comprises:
pushing, by the first BMC, the first identifier associated with the first node onto a register space of the first transceiver;
initiating, by the first BMC, a command to the first transceiver to transmit the first identifier onto the connection; and
transmitting, by the first transceiver, the first identifier onto the connection responsive to initiation of the command.

8. The computer-usable storage medium of claim 7 wherein the transceiver of each of said first node and said second node comprises an optical transceiver connected to an optical connection, and wherein the connection comprises the optical connection.

9. The computer-usable storage medium of claim 7 wherein said first node and said second node each comprise a main component and said receiving said first data and said receiving said second data occur before said main component of said first node and said second node boot up.

10. The computer-usable storage medium of claim 7, further comprising: sending said first node and said second node authorization to boot up a main component, wherein said authorization is based on said compatibility.

11. The computer-usable storage medium of claim 7, further comprising: providing said classification of said first node and said second node, said compatibility, and said topology to another entity.

12. A system for establishing connectivity of nodes, said system comprising:
a first node comprising a first base management controller (BMC), a first memory with a first data, a first transceiver coupled to a connection, and a first main component, the first BMC transmitting a first identifier associated with the first node onto the connection via the first transceiver, and receiving, while the first node is in a pre-boot environment, first data including configuration information for the first node and a second identifier from a second BMC over the connection via the first transceiver;
a second node comprising the second BMC, with a second memory with a second data, a second transceiver coupled to the connection, and a second main component, the second BMC transmitting the second identifier associated with the second node onto the connection via the second transceiver, and receiving, while the second node is in a pre-boot environment, second data including configuration information for the second node and the first identifier from the first BMC over the connection via the second transceiver; and
a resource manager executing on a processor, wherein the resource manager receives said first data and the second identifier from said first BMC, receives said second data and the first identifier from said second BMC, determines a classification of said first node and said second node and a compatibility of said first node with said second node based on said first data and said second data, and generates a topology of said first node and said second node based on the first identifier and the second identifier,
wherein transmitting, by the first BMC, the first identifier associated with the first node onto the connection via the first transceiver comprises:
pushing, by the first BMC, the first identifier associated with the first node onto a register space of the first transceiver;
initiating, by the first BMC, a command to the first transceiver to transmit the first identifier onto a connection; and
transmitting, by the first transceiver, the first identifier onto the connection responsive to initiation of the command.

13. The system of claim 12 wherein said first main component and said second main component are selected from the group of components consisting of: a processor, a network interface card, a switch, and a blade server.

14. The system of claim 12 wherein the transceiver of each of said first node and said second node comprises an optical transceiver connected to an optical connection, and wherein the connection comprises the optical connection.

15. The system of claim 12 wherein said resource manager is further configured to receive said first data and said second data before said first main component and said second main component are booted up.

16. The method of claim 1, wherein transmitting, by the second BMC, the second identifier onto the connection via the second transceiver comprises:
   pushing, by the second BMC, the second identifier onto a register space of the second transceiver;
   initiating, by the second BMC, a command to the second transceiver to transmit the second identifier onto the connection; and
   transmitting, by the second transceiver, the second identifier onto the connection responsive to initiation of the command.

17. The method of claim 1, wherein receiving, by the first BMC, the second identifier from the second BMC over the connection comprises:
   initiating, by the first BMC, a command to the first transceiver to prepare for receiving the second identifier over the connection;
   receiving, by the first transceiver, the second identifier over the connection after initiation of the command; and
   receiving, by the first BMC, the second identifier from the first transceiver.

18. The method of claim 1, wherein receiving, by the second BMC, the first identifier from the first BMC over the connection comprises:
   initiating, by the second BMC, a command to the second transceiver to prepare for receiving the first identifier over the connection;
   receiving, by the second transceiver, the first identifier over the connection after initiation of the command; and
   receiving, by the second BMC, the first identifier from the second transceiver.

* * * * *